(12) United States Patent
Galford et al.

(10) Patent No.: US 10,495,781 B2
(45) Date of Patent: Dec. 3, 2019

(54) DUAL POROSITY METHODOLOGY FOR MINERAL VOLUME CALCULATIONS IN SOURCE ROCK

(71) Applicant: Halliburton Energy Services, Inc., Houston, TX (US)

(72) Inventors: James E. Galford, Missouri City, TX (US); John Andrew Quirein, Georgetown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 925 days.

(21) Appl. No.: 14/426,462

(22) PCT Filed: Sep. 24, 2012

(86) PCT No.: PCT/US2012/056836
§ 371 (c)(1),
(2) Date: Mar. 6, 2015

(87) PCT Pub. No.: WO2014/046683
PCT Pub. Date: Mar. 27, 2014

(65) Prior Publication Data
US 2015/0234090 A1 Aug. 20, 2015

(51) Int. Cl.
*G01V 99/00* (2009.01)
*E21B 49/00* (2006.01)
(Continued)

(52) U.S. Cl.
CPC ............ *G01V 99/005* (2013.01); *E21B 49/00* (2013.01); *G01V 1/48* (2013.01); *G01V 3/38* (2013.01); *G01V 11/00* (2013.01); *G01V 3/175* (2013.01)

(58) Field of Classification Search
CPC ...... G01V 1/40; G01V 9/007; G01V 2200/16; G01N 33/24; E21B 49/00; E21B 47/06;
(Continued)

(56) References Cited

U.S. PATENT DOCUMENTS 3,748,474 A 7/1973 Murphy
4,686,364 A 8/1987 Herron
(Continued)

OTHER PUBLICATIONS

Christopher Modica et al. "Estimation of Kerogen Porosity in Source Rocks as a Function of Thermal Transformation: Example from the Mowry Shale in the Powder River Basin of Wyoming", AAPB Bullentin, V. 96, No. 1, Jan. 2012, pp. 88-107.*
(Continued)

*Primary Examiner* — Gene N Auduong
(74) *Attorney, Agent, or Firm* — Alan Bryson; Baker Botts L.L.P.

(57) ABSTRACT

A system and method for determining kerogen porosity of a formation for downhole operations is described herein. The method includes calculating a first formation characteristic and a second formation characteristic at a processor of an information handling system. The method further includes determining a kerogen porosity of the formation based, at least in part, on the first formation characteristic and the second formation characteristic. And the method also includes performing a downhole operation based, at least in part, on the determined kerogen porosity.

18 Claims, 4 Drawing Sheets

(51) Int. Cl.
  *G01V 1/48* (2006.01)
  *G01V 3/38* (2006.01)
  *G01V 11/00* (2006.01)
  *G01V 3/175* (2006.01)

(58) Field of Classification Search
  CPC ........ E21B 47/065; E21B 47/12; E21B 49/08; E21B 2049/085
  See application file for complete search history.

(56) References Cited

U.S. PATENT DOCUMENTS

| | | | |
|---|---|---|---|
| 7,011,154 | B2 | 3/2006 | Maher et al. |
| 9,097,813 | B2 * | 8/2015 | Carlson .................. E21B 17/04 |
| 2003/0178191 | A1 | 9/2003 | Maher et al. |
| 2011/0068788 | A1 | 3/2011 | Minh |
| 2011/0110192 | A1 | 5/2011 | Clavaud et al. |
| 2011/0144913 | A1 | 6/2011 | Klein et al. |
| 2012/0101732 | A1 | 4/2012 | Lan et al. |
| 2015/0330203 | A1 * | 11/2015 | Galford ................ G01N 33/241 700/275 |

OTHER PUBLICATIONS

U.S. Appl. No. 14/654,892; Galford, James E.*
John Quirein et al., "Review and Comparision of Three Different Gas Shale Interpretation Approaches", SPWLA 53$^{rd}$ Annual Logging Symposium, Cartanega, Columbia, Jun. 16-20, 2012, pp. 1-16.*
Bartenhagen, Keith, "Evaluation of Shale Gas Reservoirs Focus on Haynesville," Schlumberger, Oklahoma City, no date.
Lewis, Rick, et al, "New Evaluation Techniques for Gas Shale Reservoirs," Reservoir Symposium 2004, Schlumberger.
Schlumberger, "Well Evaluation an Integrated Well-Evaluation Process for Shale Gas Reservoirs", 2007.
Certain Vision® Message from Paradigm Marketing, "Paradigm Introduces New Academic Program," Paradigm™ Customer Newsletter, vol. 2 Ed. 6, Dec. 2009.
Certain Vision® What's New, "Paradigm SKUA and Paradigm GOCAD 2009.2 released," Paradigm™ Customer Newsletter, vol. 3 Ed. 1, Feb. 2010.
Techsia, Techlog Interactive Suite © 2008.
International Search Report and Written Opinion issued in related PCT Application No. PCT/US2012/056836 dated Jun. 19, 2013, 7 pages.
Nedhal et al., "Combining Wireline Geochemical, NMR, and Dielectric Data for Formation Evaluation and Characterization of Shale Reservoirs" in SPWLA 53rd Annual Logging Symposium, Cartagena, Columbia, Jun. 16-20, 2012, pp. 1-16.
Quirein et al., "Review and Comparison of Three Different Gas Shale Interpretation Approaches", in SPWLA 53rd Annual Logging Symposium, Cartagena, Columbia, Jun. 16-20, 2012, pp. 1-16.
Quirein et al., "Integrating Core Data and Wireline Geochemical Data for Formation Evaluation and Characterization of Shale Gas Reservoirs" SPE Article 134559, Sep. 2010.

* cited by examiner

DUAL POROSITY METHODOLOGY FOR MINERAL VOLUME CALCULATIONS IN SOURCE ROCK

CROSS-REFERENCE TO RELATED APPLICATION

This application is a U.S. National Stage Application of International Application No. PCT/US2012/056836 filed Sep. 24, 2012, which is hereby incorporated by reference in its entirety.

BACKGROUND

The present disclosure relates generally to well drilling and hydrocarbon recovery operations and, more particularly, to systems and methods for determining kerogen porosity of a formation for downhole operations.

Existing well drilling operations require information on formation characteristics to aid in drilling decisions. These formation characteristics can be acquired using numerous measurement techniques, including logging while drilling (LWD), measuring while drilling (MWD), and wireline tests. In certain instances, logs may be created from the measurement techniques that can be used to assess a given reservoir. Unfortunately, existing logging techniques are unable to discretely measure certain important formation reservoir characteristics, such as the kerogen porosity of the formation, which may indicate the hydrocarbon storage capacity of the formation. In particular, existing logging techniques cannot discretely measure the kerogen porosity because they sample substantial volumes of the formation that overshadow the nanometer scale of the kerogen pores. Likewise, determining the kerogen porosity computationally is difficult because it may require drastic alterations of the existing algorithms, which may increase the complexity and computational time of the formation assessment beyond what is required by log analyses.

FIGURES

Some specific exemplary embodiments of the disclosure may be understood by referring, in part, to the following description and the accompanying drawings.

Figure 1:
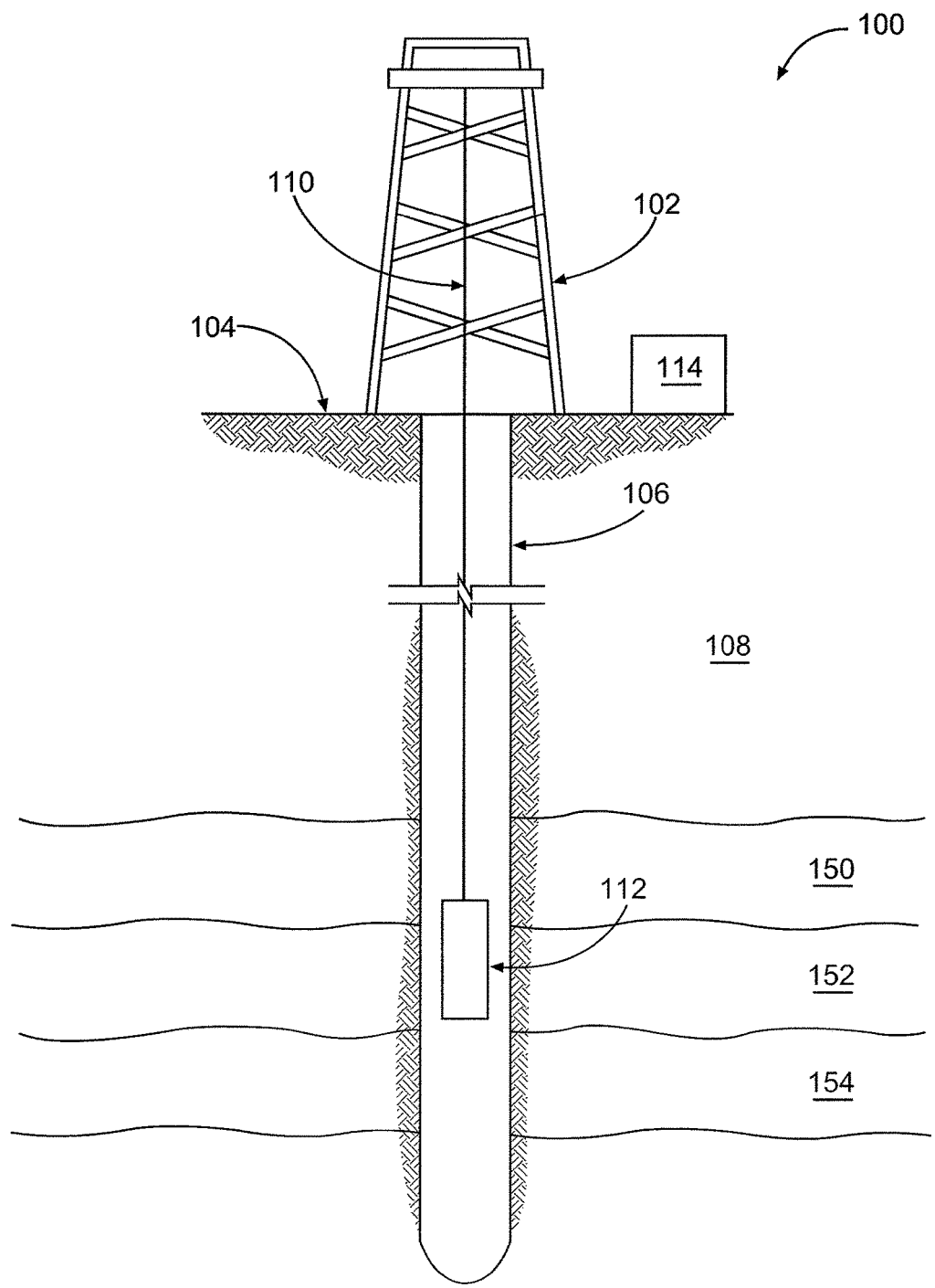
FIG. 1 illustrates an example logging system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling and hydrocarbon recovery operations and, more particularly, to systems and methods for determining kerogen porosity of a formation for downhole operations.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Certain embodiments may be applicable, for example, to logging data acquired with wireline, slickline, and LWD. Embodiments described below with respect to one implementation are not intended to be limiting.

According to embodiments of the present disclosure, systems and methods for determining kerogen porosity of a formation for downhole operations are described herein. One example method includes calculating a first formation characteristic and a second formation characteristic at a processor of an information handling system. The calculations may be based on a complex set of data from a downhole measurement or logging device, and may be based on probabilistic algorithms stored within the information handling system. The method may further comprise determining a kerogen porosity of the formation based, at least in part, on the first formation characteristic and the second formation characteristic. As will be described below, rather than solving explicitly for the kerogen porosity, which would require new probabilistic algorithms that would increase computation time and complexity, the kerogen porosity may be determined implicitly by invoking an inequality constraint containing the first formation characteristic and the second formation characteristic. Once the kerogen porosity has been determined, downhole operations—such as stimulation, geosteering, and drilling generally—may be performed based, at least in part, on the determined kerogen porosity. In certain other embodiments, the kerogen porosity may be used to carry out reservoir performance calculations via a reservoir simulator.

FIG. 1 shows an example logging system 100 that can be used for wireline logging operations. The drilling system 100 includes a rig 102 mounted at the surface 104, positioned above a borehole 106 within a subterranean formation 108. The rig 102 may be connected to a wireline 110, which may be coupled to and act as a communication medium for a downhole logging tool 112. In certain embodiments, the wireline may be communicably coupled to a control system 114 at the surface, which may collect measurements gathered by the logging tool 112. The control system 114 may comprise an information handling system, as will be described below, that may be coupled to and receive measurement and log data directly from the logging tool 112 via the wireline 110, or may receive data from a separate mass storage device that is coupled to the logging tool 112 via wireline 110. The measurement and log data may comprise a variety of nuclear, acoustic, geochemical and magnetic resonance logs intended to identify certain characteristics of the formation, and may comprise thousands of data points which must be operated on using multiple, complex algorithms within the control system 114 to produce meaningful and useful results.

The logging tool 112 may be positioned within the borehole 106 proximate to strata 150, 152, and 154 of the source rock formation 108, and may make various measurements regarding formation properties. At least one of the strata, such as stratum 152, may comprise kerogen, which comprises a mixture of organic chemical compounds that make up a portion of the organic matter in sedimentary rocks. When heat is applied to kerogen, the kerogen may be naturally converted to hydrocarbons, such as oil and gas. The process of conversion may create pores within the kerogen, trapping some of the hydrocarbons. The kerogen porosity of the stratum 152, and the source rock formation 108 generally, may correspond therefore to the ratio of the volume of all the pores in kerogen to the volume of the whole kerogen, and may identify the possible hydrocarbon storage capacity or the formation and correlate to the amount of recoverable hydrocarbons. Although kerogen is discussed above with respect to one stratum 152, kerogen may be dispersed throughout the source rock formation 108, spanning multiple strata.

Measurement and log data from the logging tool 112 may be transmitted to the surface, and may be received by the control unit 114. The control unit 114 may comprise an information handling system that performs complex computations on the measured data to determine certain formation characteristics of interest. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. The processing resources may include other processors such a graphical processing units (GPU). Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 2:
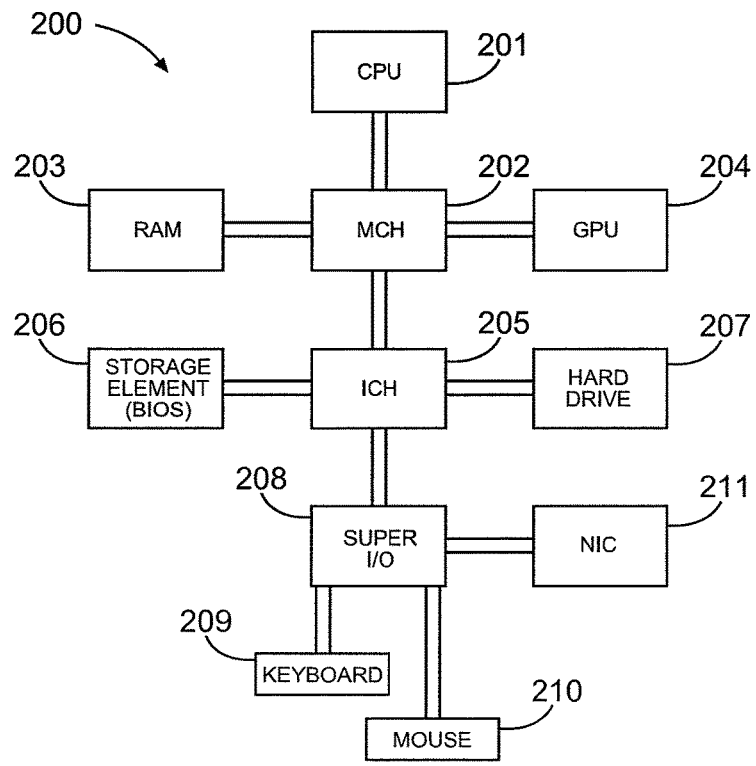
FIG. 2 illustrates an example information handling system, according to aspects of the present disclosure.

Shown in FIG. 2 is a block diagram of an example information handling system 200. A processor or CPU 201 of the information handling system 200 may be communicatively coupled to a memory controller hub or north bridge 202. The memory controller hub 202 may be coupled to RAM 203 and a graphics processing unit 204. Memory controller hub 202 may also be coupled to an I/O controller hub or south bridge 205. I/O hub 205 may be coupled to storage elements of the computer system, including a storage element 206, which may comprise a flash ROM that includes the BIOS of the computer system. I/O hub 205 is also coupled to the hard drive 207 of the computer system. The hard drive 207 may be characterized as a tangible computer readable medium that contains a set of instructions that, when executed by the processor 201, causes the information handling system 200 to perform a pre-determined set of operations. For example, according to certain embodiments of the present disclosure, and as will be discussed below, the hard drive 207 may contain instructions that when executed cause the CPU 201 to perform complex computations on measurement and log data from a logging tool, to calculate certain formation characteristics which can then be used to implicitly determine the kerogen porosity of the formation.

In certain embodiments, I/O hub 205 may also be coupled to a super I/O chip 208, which is itself coupled to several of the I/O ports of the computer system, including keyboard 209, mouse 210, and one or more parallel ports. The super I/O chip 208 may further be coupled to a network interface card (NIC) 211. The information handling system 200 may receive measurements or logs from the logging tool 112 over the NIC 211, for processing or storage on a local storage device, such as hard drive 207. In certain embodiments, the measurement and log data from a logging tool may first be transmitted and saved at a dedicated mass storage device (not shown). This may increase the speed with which the data generated by the logging tool 112 can be stored. The information handling system may then retrieve measurement data from the dedicated storage device, and perform computations on the data using algorithms stored locally within hard drive 207.

Figure 3:
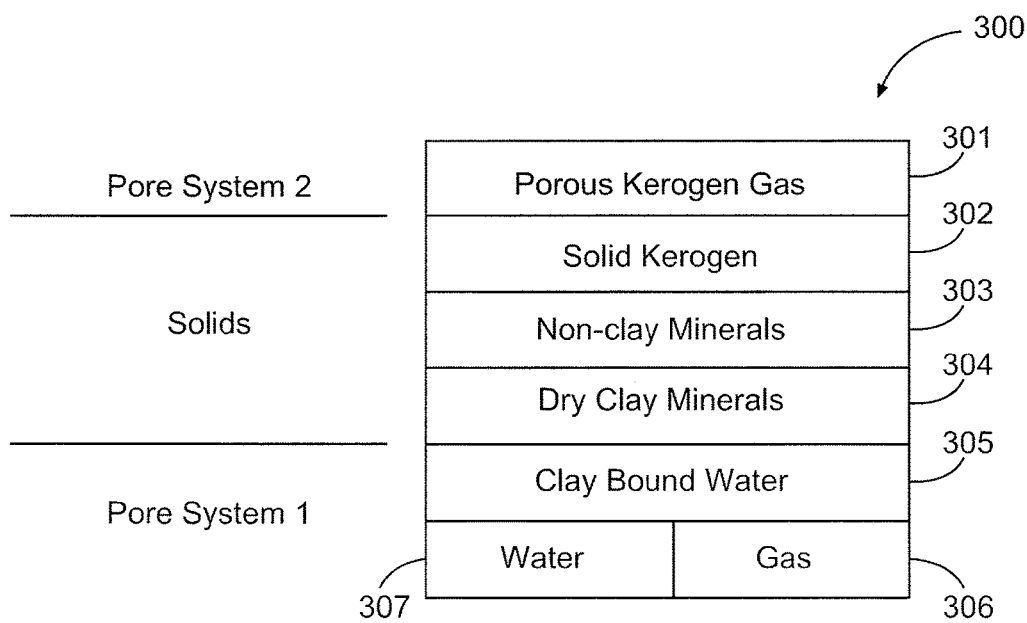
FIG. 3 illustrates an example dual porosity model, according to aspects of the present disclosure.

FIG. 3 shows an example dual porosity model 300 for a source rock reservoir, where the formation is composed of porous kerogen and porous minerals, according to aspects of the present disclosure. Other dual porosity models are possible, however, depending on the formation, as would be appreciated by one of ordinary skill in view of this disclosure. Such models may be generated using various wireline or logging measurements described above. Each of the portions shown in the dual porosity model 300 may correspond to generic representations of elements of a source rock formation. In other words, the various gasses, fluids, and minerals identified may be dispersed throughout the source rock and are only illustrated as defined portions for ease of modeling.

According to certain embodiments of the present disclosure, porous kerogen may comprise a non-solid volume, $\varphi_{pk}$, filled with in-situ generated hydrocarbons, such as oil or gas, consistent with the natural conversion process. The porous kerogen may also comprise a solid volume, $1-\varphi_{pk}$, representing the otherwise unconverted portion of the kerogen. The non-solid volume of the porous kerogen, $\varphi_{pk}$, may further correspond to kerogen porosity of the formation, as represented by the volume of porous kerogen gas 301 in the dual porosity model 300. Although a gas-filled kerogen is shown in dual porosity model 300, an oil-filled kerogen may also be modeled with a similar model.

The dual porosity model 300 may comprise a first pore system that includes clay bound water 305, porous mineral water 307, and porous mineral gas 306. The water and mineral gas within the first pore system may represent typical byproducts of hydrocarbon production, but byproducts which must be accounted for in formation modeling. Above the first pore system is a solid portion that may include non-clay minerals 303, dry clay minerals 304, and solid kerogen 302. As will be appreciated by one of ordinary skill in the art, the non-clay minerals 303, dry clay mineral 304s, and solid kerogen 302 may be found interspersed throughout strata of the formation, without definite boundaries. Finally, the dual porosity model 300 includes the porous kerogen gas 301.

Each of the portions of the dual porosity model 300 may be represented by a different bulk volume and bulk density. Bulk volume may be characterized as the volume per unit mass of a material. Bulk density may be characterized as the mass of particles of the material divided by the total volume they occupy. The entire formation represented by the dual porosity model 300 may comprise a bulk density $\rho_b$ that is a function of the bulk volumes and bulk densities of the constituent portions. For example, the bulk density $\rho_b$ of the formation may be represented by equation 1 below:

$$\rho_b = V_{pmw}\rho_w + (V_{pmg}+V_{pkg})\rho_g + V_{cbw}\rho_{cbw} + V_{dc}\rho_{dc} + V_{ncm}\rho_{ncm} + V_{sk}\rho_{sk} \qquad \text{Eq. 1:}$$

with $V_{pmw}$, $V_{pmg}$, $V_{pkg}$, $V_{cbw}$, $V_{dc}$, $V_{ncm}$, and $V_{sk}$ representing the bulk volumes of the porous mineral water, porous mineral gas, porous kerogen gas, clay bound water, dry clay, non-clay minerals, and solid kerogen, respectively; and with $\rho_w$, $\rho_g$, $\rho_{cbw}$, $\rho_{dc}$, $\rho_{ncm}$, and $\rho_{sk}$ representing the bulk densities of water, gas, clay bound water, dry clay, non-clay minerals, and solid kerogen, respectively. The combination $V_{pmg}+V_{pkg}$ of the bulk volumes of porous mineral gas and porous kerogen gas may further be represented as the total volume of gas within the formation, $V_g$. Solving for each of the above variables may be computationally difficult to the extent each variable requires a dedicated algorithm, or to the extent the logging tools do not differentiate between different values. Accordingly, solving explicitly for the volume of the porous kerogen gas, and thereby the kerogen porosity, would include complex algorithms that would increase the computational time needed to model the formation. Moreover, there is typically nothing to be gained from solving the equation explicitly for the volumes of both the porous mineral gas and the porous kerogen gas, as the downhole measurement and logging tools do not typically differentiate between these physical volumes from a practical standpoint.

According to aspects of the present disclosure, instead of solving directly for the kerogen porosity of the formation using a dedicated algorithm, the kerogen porosity may be determined indirectly by invoking an inequality constraint that incorporates formation characteristics that are already determined as part of the dual porosity model 300. According to one embodiment of the present disclosure, a method for determining kerogen porosity of a formation for downhole operations may comprise calculating a first formation characteristic and a second formation characteristic at a processor of an information handling system. In certain embodiments, the first formation characteristic may correspond to a total volume of gas of the formation, $V_g$, and the second formation characteristic may correspond to a bulk volume of the solid kerogen of the formation, $V_{sk}$. As will be appreciated by one of ordinary skill in the art in view of this disclosure the elements $V_g$ and $V_{sk}$ may be determined by the processor according to an instruction set stored within a memory element coupled to the processor. The instruction set may cause the processor to implement complex probabilistic algorithms to determine the elements $V_g$ and $V_{sk}$ for a given set of measurement or log data from a downhole measurement or logging tool. The method may comprise a separate step of receiving the set of log data from a downhole device at the information handling system, with the set of data being either received directly from the downhole tool or alternatively from a mass storage device coupled via a network to the information handling system.

The method may further include determining a kerogen porosity of the formation based, at least in part, on the first formation characteristic and the second formation characteristic. In certain embodiments determining the kerogen porosity may include invoking an inequality constraint. One such example inequality constraint is shown in equation 2, where $\varphi_{pk}$ corresponds to a non-solid volume of the porous kerogen of the formation, $1-\varphi_{pk}$ corresponds to a solid volume of the porous kerogen of the formation, $V_g$ corresponds to the first formation characteristic, and $V_{sk}$ corresponds to the second formation characteristic.

$$0 \leq V_g - ((\varphi_{pk}/(1-\varphi_{pk}))*V_{sk}) \qquad \text{Eq. 2:}$$

As will be appreciated by one of ordinary skill in the art, once $V_g$ and $V_{sk}$ are known, the inequality constraint can be invoked to impose a minimum gas volume boundary condition based on the volume of solid kerogen $V_{sk}$. The inequality constraint can then be solved for the proportion $((\varphi_{pk}/(1-\varphi_{pk}))*V_{sk}$, which corresponds to the kerogen porosity of the formation.

As will be appreciated by one of ordinary skill in the art in view of this disclosure, the proportion $(\varphi_{pk}/(1-\varphi_{pk}))$ may indicate the proportion of the volume of solid kerogen $V_{sk}$ that is non-solid, i.e., porous and filled with hydrocarbon. In the context of the dual porosity model 300, the volume of the porous kerogen gas $V_{pkg}$ may correspond to the proportion of the volume of solid kerogen $V_{sk}$. Accordingly, the variable $V_{pkg}$ in equation 1 may be represented as shown in equation 3, and may be represented as part of the total volume of gas $V_g$ in the dual porosity model 300 as shown in equation 4. Notably, $V_{pkg}$ may correspond to the kerogen porosity of the formation because unlike the mineral porosity, intra-kerogen porosity has never contained any fluid other than generated hydrocarbon.

$$V_{pkg} = (\varphi_{pk}/(1-\varphi_{pk}))*V_{sk} \qquad \text{Eq. 3:}$$

$$V_g = V_{pmg} + ((\varphi_{pk}/((\varphi_{pk}/(1-\varphi_{pk}))*V_{sk}) \qquad \text{Eq. 4:}$$

According to certain embodiments of the present disclosure, it may be assumed that the volume of porous mineral gas $V_{pmg}$ is negligible or may approach zero when compared to the total porous kerogen gas. It may then be assumed that equation 4 may be reduced by removing the $V_{pmg}$ term, which can be used to generate the inequality constraint in equation 2. Although one example inequality constraint is described herein with respect to two particular formation characteristics, it should be appreciated that other inequality constraints and other formation characteristics may be used to determine kerogen porosity.

In certain embodiments, once the kerogen porosity has been determined, the method may include performing a downhole operation based, at least in part, on the determined kerogen porosity. Performing the downhole operation based at least in part on the determined kerogen porosity may include using the determined kerogen porosity within a dual porosity model to calculate additional formation characteristics of the formation. These additional formation characteristics may then be used as part of additional algorithms used to control downhole operations such as stimulation, geosteering, and general drilling. Controlling downhole operations may include aiding in the determination to perform downhole operations, or controlling how the downhole operations are performed and where they are directed.

According to further aspects of the disclosure, a system for determining kerogen porosity of a formation for downhole operations is described below. The system may include a downhole measurement or logging device, similar to the logging tool 112 in FIG. 1. This downhole measurement or logging device may comprise a variety of sensors and may generate thousands of data points related to the surrounding formation. The system may further comprise an information handling system coupled to the downhole measurement or logging device, similar to the information handling system described with reference to FIG. 2. The information handling system may comprise a processor and a memory device coupled to the processor. The memory device may comprise a hard drive or other similar storage media, and may include a set of instructions that when executed by the processor cause the processor to perform complex computations on the thousands of data points related to the surrounding formation. In certain embodiments, the set of instructions may cause the information handling system to calculate based, at least in part on the set of log data, a first formation characteristic and a second formation characteristic; and determine a kerogen porosity of the formation based, at least in part, on the first formation characteristic and the second formation characteristic.

In certain embodiments, the calculations of the first formation characteristic and the second formation characteristic may be performed using complex probabilistic algorithms stored within the memory device. Likewise, the first formation characteristic and the second formation characteristic may correspond to a pre-determined dual porosity model generated and stored within the information handling system. The set of instructions may further cause the information handling system to invoke an inequality constraint when it determines the kerogen porosity of the formation. The inequality constraint may comprise the inequality constraint shown in equation 2, with the first formation characteristic corresponding to a total volume of gas of the formation, $V_g$, and the second formation characteristic corresponding to a bulk volume of the solid kerogen of the formation, $V_{sk}$. The information handling system may output the value of the kerogen porosity once determined, such that it may be used is part to perform subsequent downhole operations. As will be appreciated by one of ordinary skill in the art, the above equations and inequality constraints are equally applicable for oil-producing kerogen. In such an instance, the various gas volumes may be replaced with oil volumes within the dual-porosity model, but the inequality constraint in equation 2 may take a similar form.

Figure 4:
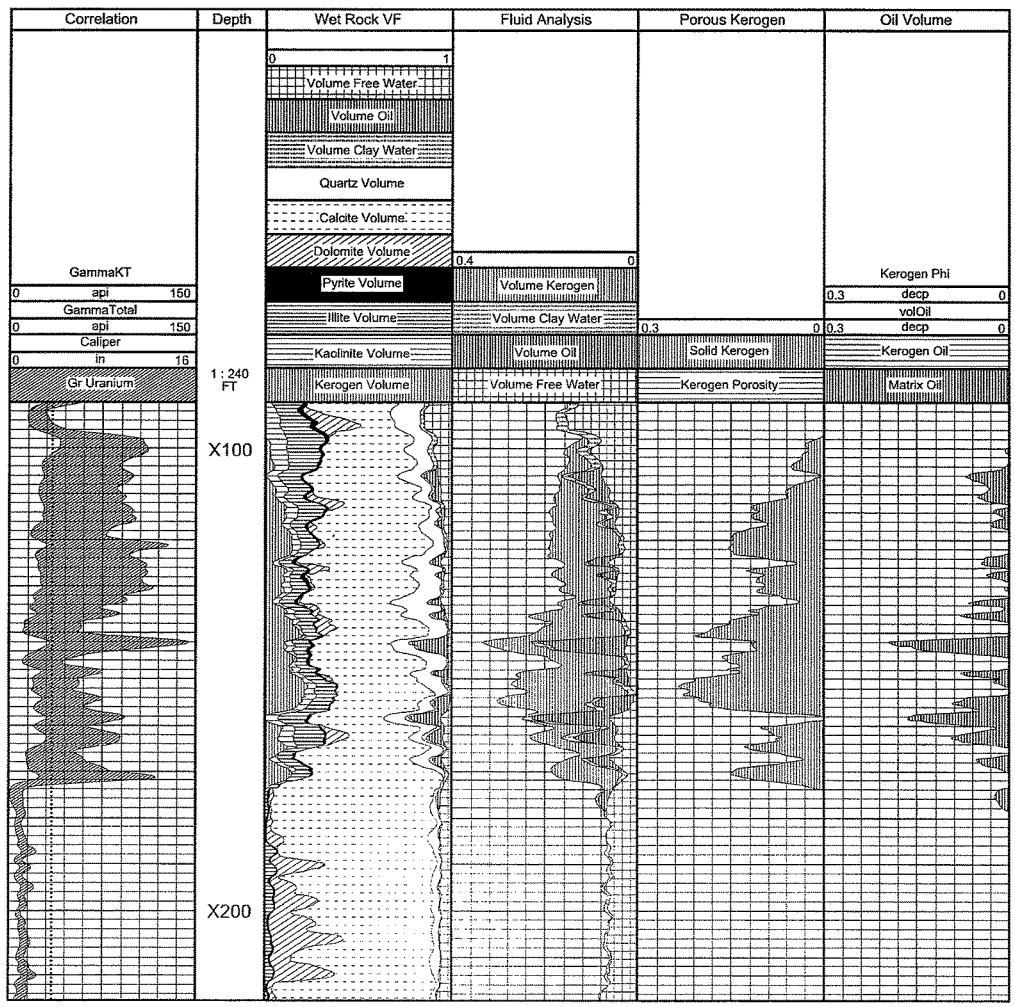
FIGS. 4 and 5 illustrate calculated results of kerogen porosity from a probabilistic solver, according to aspects of the present disclosure.
Figure 5:
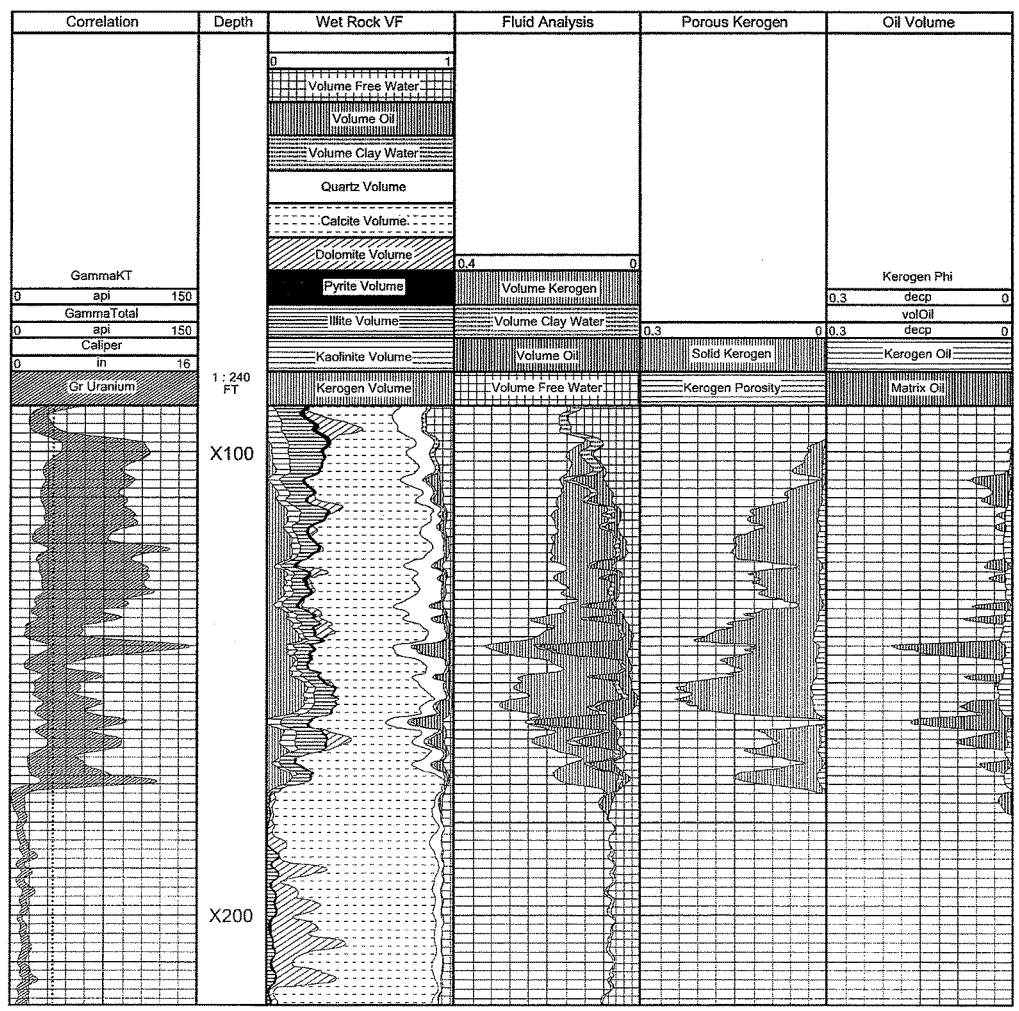

FIGS. 4 and 5 illustrate calculated results of kerogen porosity from a probabilistic solver, according to aspects of the present disclosure. The results shown in FIG. 4 were obtained without imposing an inequality constraint on the porous kerogen as it relates to the total volume of gas within the source rock. For example, in FIG. 4, oil and solid kerogen volumes are treated as independent variables, leading to several occurrences of a zero oil volume observation in the oil volume column where non-zero solid kerogen volumes were calculated in the porous kerogen column. In FIG. 5, on the other hand, the inequality constraint is invoked, such that a non-zero oil volume is observed where a non-zero solid kerogen volume is reported, as is consistent with a reasonable understanding of the maturation process that leads to the generation of hydrocarbons.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. The term "gas" is used within the scope of the claims for the sake of convenience in representing the various equations. It should be appreciated that the term "gas" in the claims is used interchangeably with the term "oil" as the inequality constraint applies equally to a formation containing kerogen that produces gas, and a formation containing kerogen that produces oil.

What is claimed is:

1. A method for determining kerogen porosity of a formation for downhole operations, comprising:
    calculating a first formation characteristic corresponding to a total volume of gas of the formation and a second formation characteristic corresponding to a bulk volume of a solid kerogen of the formation at a processor of an information handling system based at least in part on data from a logging tool positioned in the formation;
    determining a kerogen porosity of the formation based, at least in part, on the first formation characteristic and the second formation characteristic;
    calculating a third formation characteristic using the determined kerogen porosity within a dual porosity model; and
    controlling a downhole operation based, at least in part, on the determined kerogen porosity and the third formation characteristic.

2. The method of claim 1, wherein the first formation characteristic and the second formation characteristic correspond to a pre-determined dual porosity model.

3. The method of claim 1, wherein determining the kerogen porosity includes invoking an inequality constraint.

4. The method of claim 3, wherein the inequality constraint comprises the following equation:

$$0 \leq V_g - ((\varphi_{pk}/(1-\varphi_{pk}))*V_{sk});$$

wherein $V_g$ corresponds to the total volume of gas of the formation, $V_{sk}$ corresponds to a bulk volume of the solid kerogen of the formation, $\varphi_{pk}$ corresponds to a non-solid volume of the porous kerogen, and $1-\varphi_{pk}$ corresponds to a solid volume of the porous kerogen.

5. The method of claim 4, wherein $(\varphi_{pk}/(1-\varphi_{pk}))*V_{sk}$ corresponds to the kerogen porosity of the formation.

6. The method of claim 1, wherein the downhole operation comprises at least one of stimulation, geosteering, and drilling.

7. The method of claim 1, further comprising receiving a set of data from a downhole measurement or logging device coupled to the information handling system, wherein the first formation characteristic and second formation characteristic are calculated based, at least in part, on the set of data.

8. A system for determining kerogen porosity of a formation for downhole operations, comprising:
    a downhole measurement or logging device;
    an information handling system in communication with the downhole measurement or logging device, wherein the information handling system comprises:
        a processor; and
        a tangible memory device coupled to the processor, wherein the tangible memory device comprises a set of instructions that, when executed by the processor, cause the information handling system to:

calculate based, at least in part, on a set of log data from the downhole measurement or logging device a first formation characteristic corresponding to a total volume of gas of the formation and a second formation characteristic corresponding to a bulk volume of a solid kerogen of the formation;

determine a kerogen porosity of the formation based, at least in part, on the first formation characteristic and the second formation characteristic; and calculate a third formation characteristic using the determined kerogen porosity within a dual porosity model, wherein at least the third formation characteristic and the determined kerogen porosity are for controlling a downhole operation, wherein a downhole operation is controlled based, at least in part, on the third formation characteristic.

9. The system of claim 8, wherein the first formation characteristic and the second formation characteristic correspond to a pre-determined dual porosity model.

10. The system of claim 8, wherein the set of instructions further cause the information handling system to invoke an inequality constraint when it determines the kerogen porosity of the formation.

11. The system of claim 10, wherein the inequality constraint comprises the following equation:

$$0 \leq V_g - ((\varphi_{pk}/(1-\varphi_{pk}))*V_{sk});$$

wherein $V_g$ corresponds to the total volume of gas of the formation, $V_{sk}$ corresponds to a bulk volume of the solid kerogen of the formation, $\varphi_{pk}$ corresponds to a non-solid volume of the porous kerogen, and $1-\varphi_{pk}$ corresponds to a solid volume of the porous kerogen.

12. The system of claim 11, wherein $(\varphi_{pk}/(1-\varphi_{pk}))*V_{sk}$ corresponds to the kerogen porosity of the formation.

13. The system of claim 8, wherein the downhole measurement or logging device is coupled to a storage element in communication with the information handling system.

14. The system of claim 13, wherein the information handling system receives the set of log data from the storage element.

15. A method for determining kerogen porosity of a formation for downhole operations, comprising:

receiving at an information handling system a set of log data from a downhole device;

calculating based, at least in part, on the set of log data a first formation characteristic corresponding to a total volume of gas of the formation and a second formation characteristic corresponding to a bulk volume of a solid kerogen of the formation, wherein the first formation characteristic and the second formation characteristic are calculated using a processor of the information handling system;

determining a kerogen porosity of the formation based, at least in part, on the first formation characteristic and the second formation characteristic;

calculating a third formation characteristic using the determined kerogen porosity within a dual porosity model, wherein at least the determined kerogen porosity and the third formation characteristic are for controlling a downhole operation; and controlling a downhole operation based, at least in part, on the third formation characteristic.

16. The method of claim 15, wherein determining the kerogen porosity of the formation comprises invoking an inequality constraint.

17. The method of claim 16, wherein:

the inequality constraint comprises the following equation:

$$0 \leq V_g - ((\varphi_{pk}/(1-\varphi_{pk}))*V_{sk}),$$

with $V_g$ corresponding to the total volume of gas of the formation, $V_{sk}$ corresponding to the bulk volume of the solid kerogen of the formation, $\varphi_{pk}$ corresponding to a non-solid volume of the porous kerogen, and $1-\varphi_{pk}$ corresponding to a solid volume of the porous kerogen.

18. The method of claim 15, further comprising performing at least one of a stimulating, geosteering, and drilling operation downhole based, at least in part, on the determined kerogen porosity of the formation.

* * * * *